United States Patent
Crowell et al.

(10) Patent No.: US 7,519,866 B2
(45) Date of Patent: *Apr. 14, 2009

(54) COMPUTER BOOT OPERATION UTILIZING TARGETED BOOT DIAGNOSTICS

(75) Inventors: Daniel Morgan Crowell, Rochester, MN (US); Matthew Scott Spinler, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/766,535

(22) Filed: Jun. 21, 2007

(65) Prior Publication Data

US 2007/0245170 A1  Oct. 18, 2007

Related U.S. Application Data

(63) Continuation of application No. 10/803,646, filed on Mar. 18, 2004, now Pat. No. 7,266,727.

(51) Int. Cl.
G06F 11/00 (2006.01)

(52) U.S. Cl. .............. 714/36; 714/44; 714/56; 714/42; 707/206

(58) Field of Classification Search .......... 714/36, 714/44, 42, 56
See application file for complete search history.

(56) References Cited

U.S. PATENT DOCUMENTS

| | | | |
|---|---|---|---|
| 5,410,545 A * | 4/1995 | Porter et al. ............. 714/723 |
| 5,893,155 A * | 4/1999 | Cheriton ............. 711/144 |
| 6,449,735 B1 * | 9/2002 | Edwards et al. ............. 714/25 |
| 6,496,945 B2 * | 12/2002 | Cepulis et al. ............. 714/25 |
| 6,640,316 B1 * | 10/2003 | Martin et al. ............. 714/36 |
| 6,701,464 B2 | 3/2004 | Austen et al. |
| 6,889,340 B1 * | 5/2005 | Bramley, Jr. ............. 714/6 |
| 6,973,587 B1 | 12/2005 | Maity et al. |
| 7,007,202 B2 | 2/2006 | Kuroiwa et al. |
| 7,100,087 B2 | 8/2006 | Yang et al. |
| 7,206,970 B1 * | 4/2007 | Lauterbach et al. ......... 714/36 |
| 7,266,727 B2 * | 9/2007 | Crowell et al. ............. 714/36 |
| 2001/0044841 A1 * | 11/2001 | Kosugi et al. ............. 709/223 |
| 2002/0073276 A1 * | 6/2002 | Howard et al. ............. 711/113 |
| 2002/0095625 A1 * | 7/2002 | Ahrens et al. ............. 714/44 |
| 2003/0126133 A1 * | 7/2003 | Dattatri et al. ............. 707/10 |
| 2003/0163765 A1 * | 8/2003 | Eckardt et al. ............. 714/36 |
| 2003/0191978 A1 | 10/2003 | Kitamorn et al. |
| 2004/0015907 A1 * | 1/2004 | Giel et al. ............. 717/141 |
| 2005/0125709 A1 | 6/2005 | McKim, Jr. et al. |
| 2005/0229042 A1 * | 10/2005 | Crowell et al. ............. 714/36 |
| 2006/0031716 A1 | 2/2006 | Chen |

* cited by examiner

Primary Examiner—Scott T. Baderman
Assistant Examiner—Loan Truong
(74) Attorney, Agent, or Firm—Wood, Herron & Evans

(57) ABSTRACT

A method utilizes targeted boot diagnostics in connection with a boot operation to automate the handling of hardware failures detected during startup or initialization of a computer. In particular, in response to detection of a failure after initiation of and during performance of a boot operation, a targeted diagnostic operation is initiated on at least one hardware device in the computer in response to detecting the failure, such that after the targeted diagnostic operation is initiated, the boot operation may be completed.

4 Claims, 2 Drawing Sheets

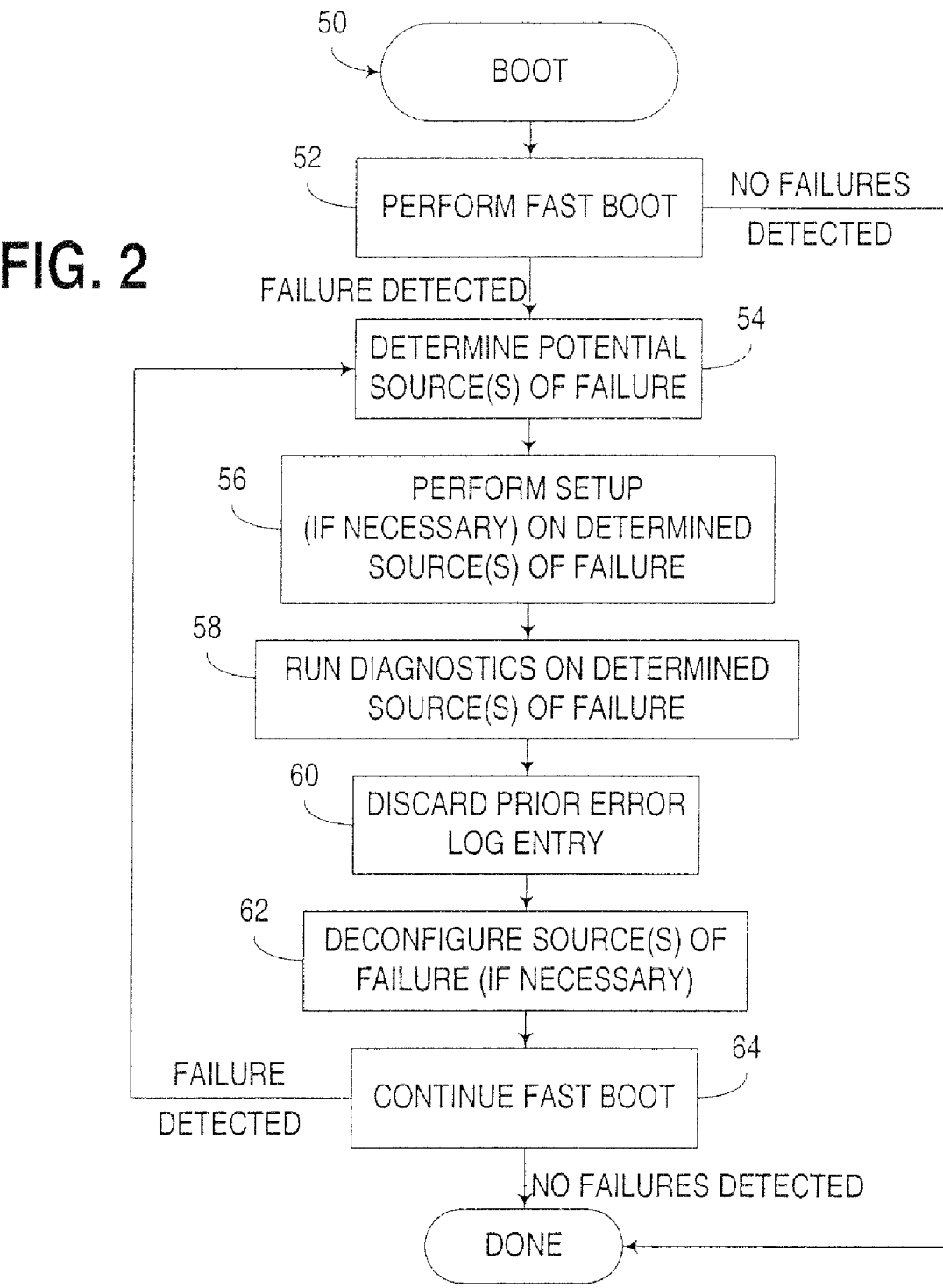

COMPUTER BOOT OPERATION UTILIZING TARGETED BOOT DIAGNOSTICS

CROSS-REFERENCE TO RELATED APPLICATIONS

This application is a continuation of U.S. patent application Ser. No. 10/803,646, entitled "COMPUTER BOOT OPERATION UTILIZING TARGETED BOOT DIAGNOSTICS", filed on Mar. 18, 2004 now U.S. Pat. No. 7,266,727 by Daniel Morgan Crowell et al. (ROC920030393US1), the entire disclosure of which is incorporated by reference herein.

FIELD OF THE INVENTION

The invention relates to computers and computer software, and in particular, to initialization, or booting, of a computer during power-up.

BACKGROUND OF THE INVENTION

Practically every type of computer and other programmable electronic device requires some form of initialization upon initial power-up. Such initialization, also referred to as a boot operation, typically involves the initialization of hardware and/or software to bring the device from a powered-off state to a normal operating state.

Whereas in some relatively simple devices the initialization process is so quick as to be indiscernible to a user, with more complex devices, the initialization process can take a substantial amount of time to complete. For some single-user computers, for example, a boot operation may take several minutes to complete. With more complex computers, such as servers and other multi-user computers, a boot operation can take even longer.

From the perspective of a computer, a boot operation typically involves the initialization and set up of various hardware devices such as processors, memory, and peripheral or input/output devices. A boot operation also typically includes initial software set up to load operating system software into the working storage of the computer. In addition, during a number of these initialization operations, various diagnostic operations may also be performed on the various hardware devices on the computer. For example, many integrated circuits, or chips, incorporate built-in self-test (BIST) capabilities to perform internal hardware diagnostics and report any errors that are detected in such circuits. In addition, diagnostic operations such as memory tests and error correction code (ECC) tests may be performed on memory devices to verify proper memory cell operation. Similar testing may be performed on interfaces, printed circuit boards, and other devices, e.g., using scan chain testing and other known techniques.

In addition to detecting failures, diagnostic operations performed during boot operations also typically enable the sources of such failures to be isolated in any problematic hardware devices to enable the computer to complete the boot operation and enter an operational state, but with the problematic hardware devices disabled or otherwise made inaccessible to the computer. As such, a computer may still be able to enter its operational state irrespective of some hardware failures.

The performance of diagnostic operations on hardware devices during a boot operation, however, often comes with a performance penalty. As such, diagnostic operations often increase the time required to complete a boot operation.

Particularly in high availability environments, it is often desirable to minimize system down time, and as a consequence, minimize the amount of time required to boot or initialize a computer. For this reason, in many instances a decision is made to forego many of the diagnostic operations that may be performed during a boot operation in favor of faster initialization.

In some high performance computers, e.g., the iSeries and pSeries servers available from International Business Machines Corporation, a boot operation commonly referred to as an initial program load (IPL) operation may be performed in either a "fast" mode or a "slow" mode. In a fast boot operation, the primary focus of the boot operation is to get the computer to an operational state as quickly as possible. As a result, only minimal hardware diagnostics are run on the system, such as performing some limited ECC checks, writing initial zero values to memory, and various BIST operations that are run by default by a number of integrated circuits at power-on. In a slow boot operation, on the other hand, full hardware diagnostics are run on every hardware device in the system. However, the full diagnostics performed during the slow boot operation may increase the overall boot time by 25 percent or more as compared to a fast boot operation.

In many instances, the additional overhead of a slow boot operation is not deemed warranted, and as a result, the aforementioned computers are typically initialized using a fast boot operation whenever possible. In the event of a hardware failure during a fast boot operation, however, the failure will often be expressed in an unexpected manner, as any hardware diagnostics that might otherwise detect the failure in a particular device are typically not performed during the fast boot operation. As an example, an interface alignment procedure during a fast boot operation may fail because of a bad wire on an interface, however, due to the lack of diagnostics run during the fast boot operation, the boot would simply fail unexpectedly. In addition, the defective part at issue in such a circumstance may or may not be identified depending on how the failure is expressed, i.e., based upon how the failure causes the unexpected result in the computer. In many instances, for example, the computer may simply lock up and become unresponsive.

To address this problem, it may be necessary to essentially reboot a computer that fails as a result of a fast boot operation in "slow" mode to run full hardware diagnostics on every device in the system. Such a reboot may be performed manually, i.e., in response to user intervention, or may be automatically triggered as a result of a failure during a fast boot operation. Nonetheless, in order to correctly identify and isolate a failure, a computer is typically required to be fully rebooted using the slow boot operation, thus increasing the time needed for the computer to initialize to an operational state.

Another drawback to the use of fast and slow boot operations is the potential for generating misleading error logs. Error logs are typically generated in response to identified failures in a computer. In the event that a failure is detected during a fast boot operation, an error log may be generated for the failure. However, given that the failure may be expressed not as a result of a diagnostic operation, the error log may be unable to accurately reflect the source of the failure. Moreover, if a failure occurs in a fast boot operation, and the system is then rebooted using the slow boot operation, the slow boot operation may create another error log related to the failure, which in the best case is an exact duplicate of the error log generated during the fast boot operation, and at the worst case, identifies an entirely different source of the same failure. The presence of multiple error logs directed to the same failure can complicate diagnosis and repair of a computer by service personnel. Therefore, substantial need exists in the art for an improved manner of initializing a computer or other programmable electronic device, which provides faster initialization while ensuring appropriate detection and isolation of failures occurring during a boot operation.

SUMMARY OF THE INVENTION

The invention addresses these and other problems associated with the prior art by providing a method in which targeted boot diagnostics are utilized in connection with a boot operation to automate the handling of hardware failures detected during startup or initialization of a computer. In particular, in response to detection of a failure after initiation of and during performance of a boot operation, a targeted diagnostic operation is initiated on at least one hardware device in the computer in response to detecting the failure, such that after the targeted diagnostic operation is initiated, the boot operation may be completed.

In embodiments consistent with the invention, for example, a fast boot operation, utilizing limited diagnostics, may be initiated. Then, upon detection of a failure during the fast boot operation, targeted diagnostics may be initiated on one or more hardware devices that are potential sources of the failure, such that any failed devices may be isolated or otherwise deconfigured, and such that the fast boot operation may then be allowed to complete. Thus, in many embodiments, rather than having to reboot after a failure using a slow boot operation during which full diagnostics are performed, only targeted diagnostics, directed to potential sources of a failure, may be performed, typically reducing the performance overhead associated with full diagnostics, and often eliminating the need for a reboot of the computer.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 2 is a flowchart illustrating a boot routine executed by the computer of FIG. 1.

DETAILED DESCRIPTION

Figure 1:
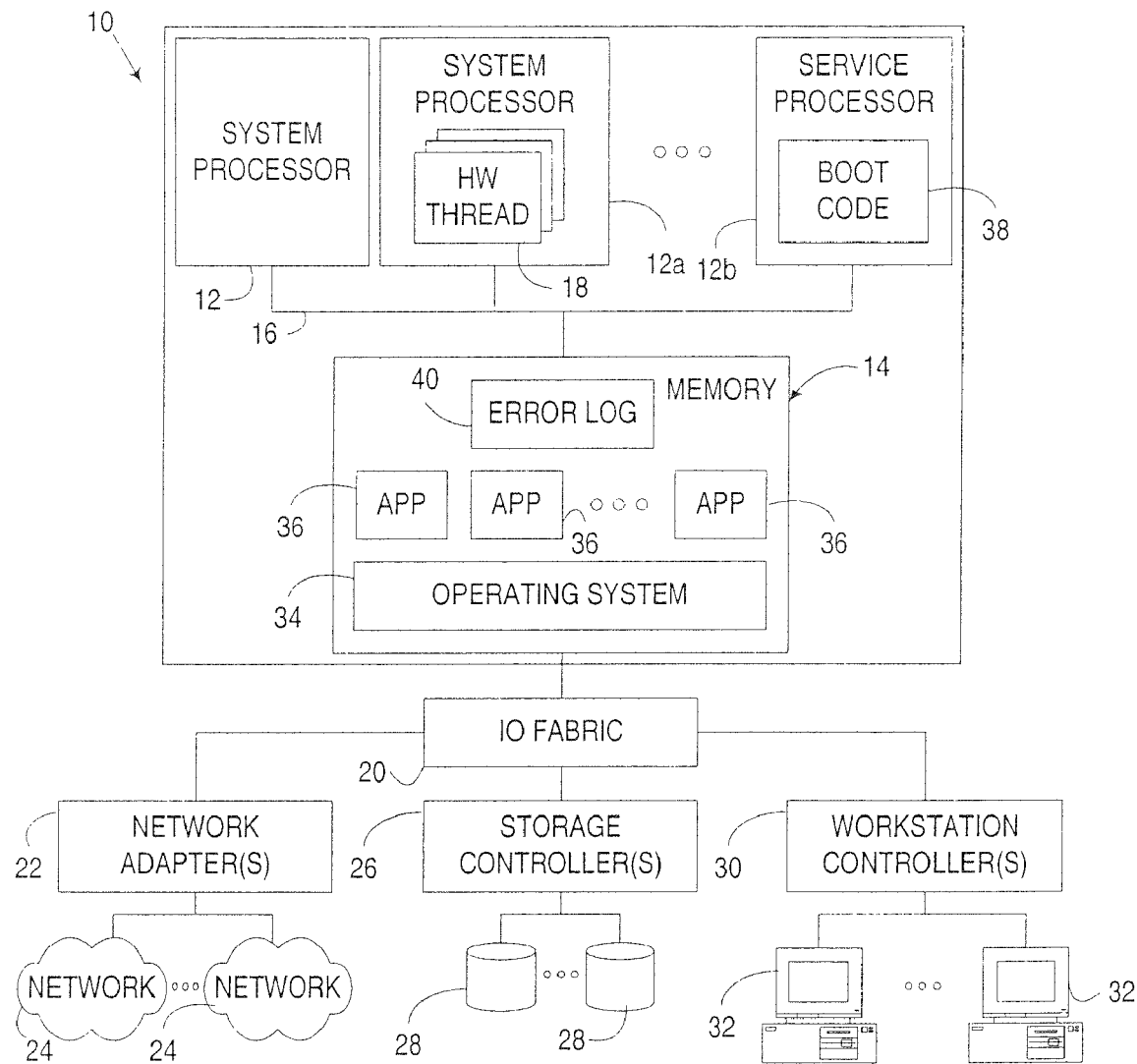
FIG. 1 is a block diagram of the principal hardware components in a computer incorporating targeted boot diagnostics consistent with the invention.

The embodiments discussed hereinafter utilize targeted boot diagnostics to minimize boot time for a computer, even in instances where a failure is encountered during the boot process. In particular, in response to detection of a failure during a boot process, a targeted diagnostic operation is performed on one or more hardware devices, and the boot process is thereafter completed. Typically, the targeted diagnostic operation is performed only on those devices that are potential sources of the failure, and thus reduces the amount of diagnostics that would otherwise be performed in the case of a slow mode or other boot process during which full diagnostics are performed. Moreover, typically the detection of the failure, the initiation of the targeted diagnostic operation, and the resumption or completion of the boot process thereafter are performed without user intervention, and without the need for a reboot operation, thus enabling fast and automated recovery from a failure.

A targeted diagnostic operation consistent with the invention includes at least an attempt to identify a source of a detected failure, based upon running diagnostic routines on one or more hardware devices that are potential sources of the failure. A targeted diagnostic operation may also include corrective functionality to isolate or otherwise deconfigure a failed hardware device to enable a boot operation to proceed irrespective of the detected failure.

In a number of embodiments consistent with the invention, the boot operation being performed is a fast boot operation, i.e., incorporating more limited diagnostics, in contrast with a slow boot operation during which more thorough and time consuming diagnostics are performed. As a result, the detection of a failure that triggers a targeted diagnostic operation consistent with the invention typically occurs prior to performing any diagnostics operations that would identify the source(s) of the detected failure. Furthermore, through the use of targeted diagnostic operations, the need to reboot a computer after detection of a failure in a fast boot operation, as well as the need to perform full diagnostics, e.g., as supported by a slow boot operation, are often avoided. As a result, faster initialization of a computer is typically still realized even in the event of a detected failure.

It should be noted that the detection of a failure that triggers a targeted diagnostic operation may occur as a result of a failure in a hardware device for which no diagnostic operation has net been performed. In addition, in some embodiments, the detection of a failure may occur as a result of a failure in a hardware device for which only limited diagnostic operations, which were unable to identify the failure, were performed. In many instances, the detection of the failure does not identify the true source of the failure, only that a failure has occurred. As such, this is in contrast to conventional slow boot operations, where failures are detected as a result of the full diagnostics being performed on a system, but where diagnostic operations are not specifically triggered in response to detected failures.

Turning now to the Drawings, wherein like numbers denote like parts throughout the several views, FIG. 1 illustrates the principal hardware components in an apparatus 10 capable of implementing targeted boot diagnostics consistent with the invention. Apparatus 10 is illustrated as a multi-user computer, and may generically represent, for example, any of a number of multi-user computers such as a network server, a midrange computer, a mainframe computer, etc., e.g., an IBM eServer iSeries or pSeries computer. However, it should be appreciated that the invention may be implemented in other computers and data processing systems, e.g., in single-user computers such as workstations, desktop computers, portable computers, and the like, or in other programmable electronic devices (e.g., incorporating embedded controllers and the like). Apparatus 10 will hereinafter also be referred to as a "computer," although it should be appreciated the term "apparatus" may also include other suitable programmable electronic devices consistent with the invention.

Computer 10 generally includes one or more processors 12 coupled to a memory 14 via a bus 16. Each processor 12 may be implemented as a single threaded processor, or as a multithreaded processor, such as with processor 12a, which is shown incorporating a plurality of hardware threads 18.

In addition, one or more of processors 12 (e.g., processor 12b) may be implemented as a service processor, which is used to run specialized firmware code to manage system boot up (also referred to as system initialization or initial program load (IPL)), and to otherwise monitor, diagnose and configure system hardware. Generally, computer 10 will include one service processor and multiple system processors, which are used to execute the operating systems and applications resident in the computer, although the invention is not limited to this particular implementation. In some implementations, a service processor may be coupled to the various other hardware components in the computer in manners other than through bus 16.

Memory 14 may include one or more levels of memory devices, e.g., a DRAM-based main storage, as well as one or more levels of data, instruction and/or combination caches, with certain caches either serving individual processors or multiple processors as is well known in the art. Furthermore, memory 14 is coupled to a number of types of external devices via an IO fabric 20, e.g., one or more network adapters 22 (for interfacing the computer with network(s) 24), one or more storage controllers 26 (for interfacing the computer with one or more storage devices 28) and one or more workstation controllers 30 (for interfacing with one or more terminals or workstations 32 via a plurality of workstation adapters).

Computer 10 operates under the control of an operating system 34, and executes or otherwise relies upon various computer software applications, components, programs, objects, modules, data structures, etc., e.g., one or more applications 36. In addition, typically embedded into the firmware of service processor 12b is a boot program, or boot code 38, which is utilized to manage the initialization or boot process of computer 10, which may additionally generate an error log 40 indicating any errors detected during initialization of the computer. As is known in the art, error log 40 may be accessed by a user after initialization to identify any errors that occurred during initialization. Also, it will be appreciated that boot code 38 may be executed by other processors and/or may be resident in other memory in computer 10.

Additional applications, components, programs, objects, modules, etc. may also execute on one or more processors in another computer coupled to computer 10 via a network, e.g., in a distributed or client-server computing environment, whereby the processing required to implement the functions of a computer program may be allocated to multiple computers over a network. In addition, computer 10 may be implemented as a logically-partitioned computer, whereby multiple partitions, each with a separate operating system, are resident in the computer.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Now turning to FIG. 2, an exemplary boot routine 50, executed by boot code 38 resident in service processor 12b, is illustrated in greater detail. Routine 50 is typically initiated during start-up of the service processor, which occurs very shortly after initial power-up of computer 10, and begins in block 52 by performing a fast boot operation. As shown in FIG. 2, if no failures are detected during the fast boot operation, the fast boot operation completes, and routine 50 is terminated with the system restored to an operational state.

However, if a failure is detected during performance of the fast boot operation, flow is diverted to block 54 to attempt to determine the potential source(s) for the detected failure. Examples of failures that may be detected during a fast boot operation include, for example, integrated circuits or chips for which the clocks cannot be started or stopped, memory problems resulting in uncorrectable errors, error codes and/or lock-up conditions, initialization of interfaces between chips where failure codes are returned, etc.

As such, in the illustrated embodiment, a failure may be detected, for example, as a result of an indeterminate error being detected during the boot up process. A failure may also be detected, for example, in response to a lock-up condition. It will be appreciated that practically any failure condition that conventionally causes a fast boot operation to initiate a reboot or otherwise signal a failure may cause a diversion of program flow to block 54.

The determination of the potential source(s) of failure in block 54 is typically dependent upon the type of failure detected. In many instances, a particular failure will be isolated to one or a few different hardware devices, e.g., one or more specific processors, memory devices, peripheral devices, chips, interfaces, cards, etc. As such, block 54 identifies the one or more sources that are potentially a cause of a particular failure. For example, a table or other data structure may be used to correlate error signatures with devices and diagnostic operations to be performed.

Next, block 56 performs any necessary set up on the determined source(s) of failure. In many instances, no such set up is required prior to diagnosing a failure; however, in some instances, it may be desirable to perform initial set up on specific hardware devices as may be required before running diagnostic operations on such devices.

Next, block 58 runs targeted diagnostics on the determined source(s) of failure. Practically any diagnostic operation capable of being utilized in connection with a particular hardware device may be used in block 58 consistent with the invention. For example, various memory tests, ECC checks, interface checks, scan chain tests, BIST operations, etc. may be used. As a result of running the diagnostics, one or more sources of the failure are identified. In addition, error logs may be generated by the diagnostic operations.

Control then passes to block 60 to optionally discard any prior error log entry created as a result of the failure during the fast boot operation. By doing so, any additional error log entries generated as a result of running targeted diagnostics will not be presented as duplicates of the prior entry.

Next, block 62 deconfigures the source(s) of failure, if necessary. As a component of this operation, the computer may essentially be reconfigured to account for the isolation of the failed device. By deconfiguring any such source(s), the boot operation is allowed to proceed with the failed source(s) disabled or otherwise made inaccessible to the system once the system has been restored to an operational state. The deconfiguring of a hardware device may vary depending on the type of hardware device. For example, for memory devices, deconfiguring such devices may incorporate configuring the system to not access those specific failed devices. Likewise, for failed processors, such processors may be deconfigured and left unused and dormant by the system. For various I/O devices, deconfiguring may simply incorporate ignoring such devices and omitting the installation of driver software associated with such devices. It will be appreciated that various alternate mechanisms for deconfiguring hardware devices may be used in the alternative.

Next, once any necessary source(s) of failure are deconfigured, control passes to block 64 to continue the current fast boot operation at the previous failure point. As with block 52, if the fast boot operation completes without the detection of any additional failures, routine 50 is complete, and the system is restored to an operational state. Otherwise, if another failure is detected as the fast boot operation proceeds from the previous failure point, control returns to block 54 to determine the potential sources of the new failure.

As noted above, in routine 50, an error log generated for a failure during a fast boot operation may be optionally discarded to avoid the creation of duplicate error log entries. In the alternative, the duplicate error logs may be retained. In other embodiments, routine 50 may inhibit creation of an error log entry during the fast boot operation such that the only error log entry recorded as a result of a failure is that generated by a later targeted diagnostics operation.

In operation, therefore, a fast boot operation consistent with the invention proceeds in much the same manner as a conventional fast boot operation when no failures are detected. However, upon occurrence of a failure, additional targeted diagnostics are performed in response to such a failure to identify and optionally isolate any failed hardware devices. In addition, after identifying and isolating any failed hardware devices, the same fast boot operation is resumed at the previous failure point, thus eliminating the need to reboot the system.

As an example, consider a fast boot operation consistent with the invention performed on a computer wherein one of the integrated circuits or chips is unable to start its clock. Using routine 50, a fast boot operation will attempt to start the clocks on all of the chips in the computer, and may do so without performing any diagnostic operations on such chips. In the event that a particular chip reports an inability to start its clock, the fast boot operation may generate an error log noting an inability to start the clock on the chip. Consistent with the invention, the detection of this failure may result in a targeted diagnostic operation being performed to run BIST, e.g., a logic and/or array BIST operation on the chip, which may be used to identify the specific error that is inhibiting starting of the clock on the chip. For example, if the chip is a multiprocessor chip, built-in self-testing may identify a specific processor core as being defective. As a result of the targeted diagnostics operation, the error log may be updated to report the failure of the specific processor core, and optionally, the prior error log entry identifying the inability to start the clock on the chip may be removed. In addition, the chip, or even the defective processor core by itself, may then be deconfigured to isolate the failure from the system. Thereafter, the fast boot operation may be permitted to proceed from the failure point, thus enabling the system to be restored to an operational state without the need for a "slow" mode reboot.

Among other benefits, embodiments of the invention are capable of efficiently performing diagnostics only on potential failure sources, and only when failures are detected. Moreover, the reliability and utility of error logs are improved, and the need for user intervention is often decreased (even when a reboot policy is set to zero, i.e., no reboots permitted).

Various additional modifications will be apparent to one of ordinary skill in the art. Therefore, the invention lies in the claims hereinafter appended.

What is claimed is:

1. A method of booting a computer with only one boot operation, the method comprising:

initiating a single boot operation, wherein the single boot operation comprises a fast boot operation;

detecting a failure after initiation of and during performance of the single boot operation, wherein the failure is initially detected in the single boot operation;

attempting to identify a source of the failure by initiating a targeted diagnostic operation on at least one hardware device in the computer that is a potential source of the failure in response to detecting the failure, wherein the failure is associated with a failed hardware device, and wherein detecting the failure is performed prior to initiating any diagnostic operation on the failed hardware device during the single boot operation to attempt to identify the source of the failure, and wherein initiating the targeted diagnostic operation identifies the failed hardware device;

isolating the failed hardware device responsive to the targeted diagnostic operation;

reconfiguring the computer to account for isolating the failed hardware device in response to the targeted diagnostic operation;

completing the single boot operation after initiating the targeted diagnostic operation, isolating the failed hardware device and reconfiguring the computer;

logging an error detected by the targeted diagnostic operation; and discarding an error log generated during the boot operation prior to initiating the targeted diagnostic operation.

2. The method of claim 1, wherein isolating the failed hardware device comprises deconfiguring the failed hardware device.

3. The method of claim 1, wherein the targeted diagnostic operation is initiated in response to a detected failure only for those hardware devices that are potential sources of the detected failure.

4. The method of claim 1, wherein detecting the failure, initiating the targeted diagnostic operation and completing the boot operation are performed without user intervention.

* * * * *